Jan. 9, 1945.  W. P. LEAR  2,367,033
ACTUATOR MOUNTING
Filed July 2, 1943
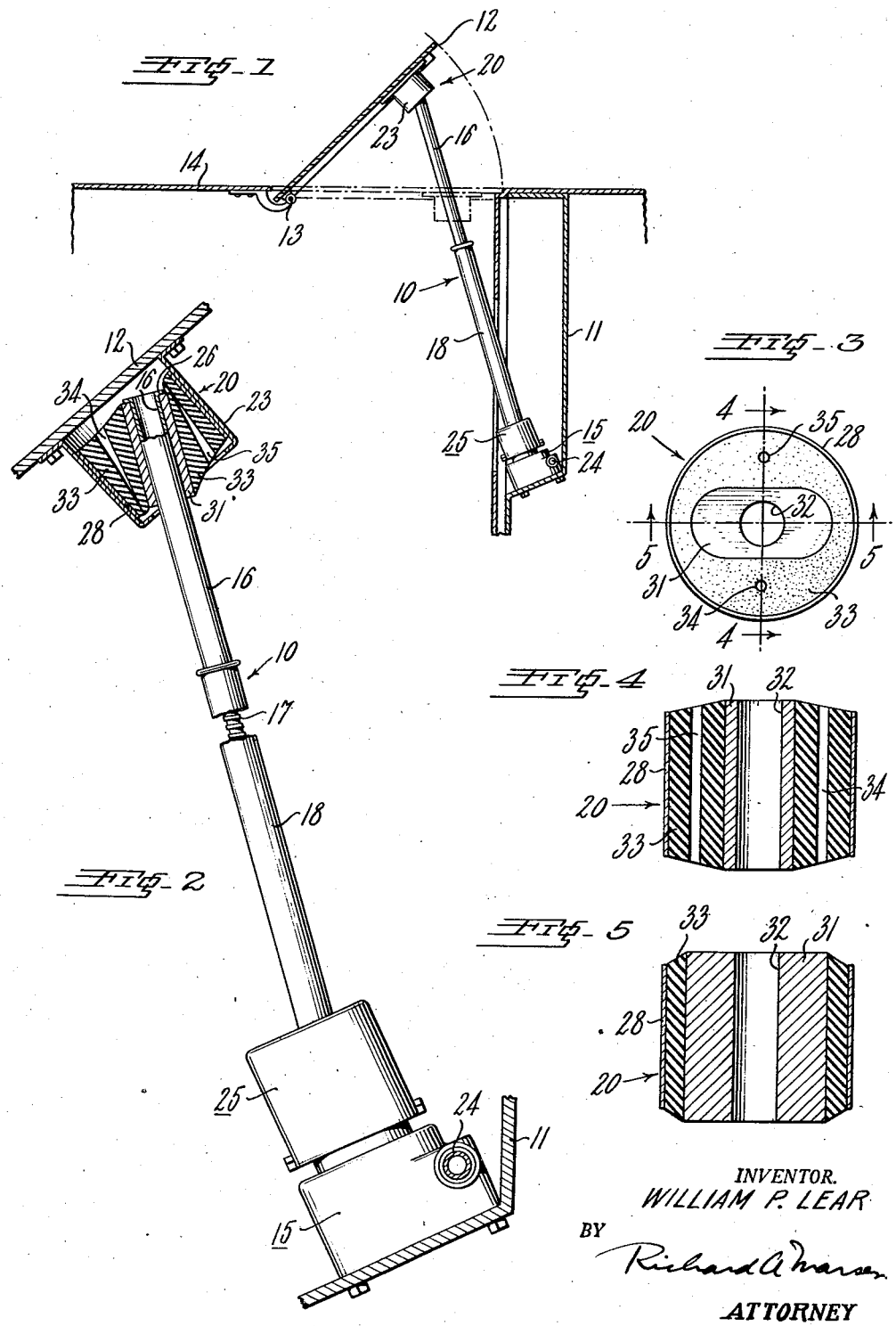
INVENTOR.
WILLIAM P. LEAR
BY
Richard A. Marsen
ATTORNEY Patented Jan. 9, 1945

2,367,033

UNITED STATES PATENT OFFICE 2,367,033

ACTUATOR MOUNTING

William P. Lear, North Hollywood, Calif., assignor to Lear Avia, Inc., Piqua, Ohio, a corporation of Illinois Application July 2, 1943, Serial No. 493,189

8 Claims. (Cl. 287—85)

This invention relates to shock absorbing mounting means, and more particularly to flexible force transmitting mounting arrangements for mechanical actuators. The present application is a continuation-in-part of my copending application Serial No. 481,980 filed April 6, 1943 and assigned to the same assignee as is this case.

It is among the objects of this invention to provide flexible force transmitting mounting means for linear actuators; to provide a novel shock absorbing mounting means including a resilient body having the greater part of its mass disposed in the plane of normal stress transmission; to provide a shock absorbing mounting means including a mass of resilient material formed with apertures to permit flow of the material under stress conditions; and to provide a flexible mounting means comprising an outer member circular in cross-section, an inner member having a non-circular cross-section, and a body of rubber disposed between and bonded to said members.

These and other objects of the invention will be apparent from the following description and accompanying drawing. In the drawing:

Fig. 1 is an elevation view, partly in section, illustrating a device incorporating the invention.

Fig. 2 is an enlarged view of the device of Fig. 1, with one of the associated mounting means shown in section.

Fig. 3 is a plan view of the mounting means of the present invention.

Fig. 4 is a cross-section of the mounting means on the line 4—4 of Fig. 3.

Fig. 5 is a cross-section of the mounting means on the line 5—5 of Fig. 3.

The invention is of general application, and is specifically applicable to linear actuators for displaceable elements of an aircraft, such as landing gears, wing flaps, cowl flaps, etc. Such elements are normally angularly displaceable with respect to the body of the aircraft. Where mechanical connections are used to controllably displace the elements, they are subject to deterioration due to vibrational stresses when the airplane is in flight. Furthermore, they are not effective to hold the movable members in a stably operated intermediate position. As disclosed in my Patent No. 2,319,463 and copending application referred to, such defects inherent in the prior art actuators have been overcome by providing shock absorbing mountings therein, which mountings include resilient bodies normally maintained in a stressed shear condition. The stressed condition of the resilient bodies maintains the movable elements in stable operated position on the aircraft.

In the present invention, a shock absorbing mounting including a resilient body is provided in which the direction of stress transmission is normally in a given plane. The resilient body has the major part of its mass disposed within an area on either side of such plane. Additionally, the body is formed with apertures in such plane which provide for flow of the resilient material under the stress conditions. The resultant structure enables economy in the amount of rubber or other resilient material required.

Referring to the drawing, a linear actuator 10 is shown in Fig. 1 as connected at one end to driving mechanism 15 mounted on a fixed portion 11 of an aircraft 14. The opposite end of the actuator 10 is connected to a movable member 12, such as an engine cowl flap hingedly connected at 13 to the aircraft body 14, and adapted to be angularly displaced with respect thereto. Linear actuator 10 may be of the type described in my above patent and copending application. It includes a pair of longitudinally displaceable relatively rotatable members, such as a sleeve 16 provided with internal threads, or with a nut, cooperating with a screw 17. An outer sleeve 18 preferably surrounds and is coextensive with screw 17 to protect the same in its extended position from the entrance of foreign particles.

A mounting member 20 constructed in accordance with the present invention is secured to the outer end of sleeve 16 in any suitable manner. For instance, sleeve member 16 may be bent over, as at 26, and have a press fit or be keyed to the central piece 31 of mounting means 20. A torque transmitting mounting means 25 is secured between screw 17 and driving mechanism 15 in any suitable manner. Mounting means 25 and mechanism 15 may be of the type described in my above referred to patent. In the event the mounting means 25 is stationary with respect to fixed portion 11 and disposed between the ends of actuator 10, as disclosed in Figs. 7, 8 and 9 of my said copending application, the mounting means 25 may be constructed the same as mounting means 20. As described in the said patent, gear transmission 15 may be driven through the medium of suitable driving connections, such as flexible shafting 24 which may be connected to a power drive means, not shown.

As shown more particularly in Figs. 2 through 5, mounting means 20 comprises an outer annular sleeve member 28 which is preferably circular in cross-section. Sleeve member 28 is adapted to be secured within the cup-shaped member 23 connected to member 12. An elongated inner member 31 of substantially rectangular or substantially elliptical cross-section is disposed within member 28. Member 31 is provided with an aperture 32 for receiving sleeve 16. Members 28 and 31 are concentric and axially aligned. A body or mass 33 of resilient material, such as rubber, is disposed between and bonded to members 28 and 31. Body 33 is formed with apertures 34 and 35 extending parallel to the axes of members 28 and 31. Apertures 34 and 35 are in the plane of the minor axis of the elliptical cross-section of member 31. As shown, the greater part of the mass of rubber body 33 is disposed at an area adjacent the plane through such minor ellipse axis.

By reference to Fig. 2, it will be noted that mounting member 20 is so disposed that relative angular displacement thereof normally is in the plane of the minor axis of the elliptical cross-section of member 31. Thus, the greater mass of the rubber body 33 is available for transmitting force in such displacement plane between members 28 and 31. Apertures 34 and 35 provide for flow of the rubber body 33 under such stress conditions.

Referring to Figs. 1 and 2, it will be noted that mounting member 20 is angularly displaced, always in the same plane, with respect to actuator 10 in substantially all operative positions of member 12. This, in turn, results in the rubber body 33 being in a stressed condition in the same plane at substantially all times. As explained in my said patent, the stressed condition results in holding member 12 in a stably operated position regardless of its relative angular displacement with respect to aircraft body 14.

The disclosed mounting means 20 provides economy of rubber due to the use of member 31 of substantially rectangular or substantially elliptical cross-section. More efficient disposition of the rubber body 33 is obtained by properly aligning the mounting member 20 so that its members are angularly displaced in the plane of the minor axis of member 31. Less rubber need be disposed in the plane of the major axis, as the stress will be in the plane of the minor axis.

While a specific embodiment of the invention has been shown and described to illustrate the principles of the invention, it will be obvious that these principles may otherwise be embodied.

What is claimed is:

1. A flexible, force transmitting mounting means for linear actuators comprising, in combination, a pair of concentric inner and outer members, one of said members being adapted to be secured to a linear actuator and the other of said members being adapted to be secured to an element associated with the linear actuator and angularly displaceable with respect thereto, one of said members having a circular cross-section and the other of said members having a substantially rectangular cross-section; and a body of rubber disposed between and bonded to said members.

2. A shock absorbing flexible connector for a linear actuator including an outer annular sleeve member and an inner member having a substantially rectangular cross-section, said members being axially aligned; one of said members being adapted to be secured to the linear actuator and the other of said members being adapted to be secured to an element associated with the linear actuator and angularly displaceable with respect thereto; and a mass of resilient material disposed between and flexibly interconnecting said members.

3. A flexible thrust transmitting mounting means, for transmitting thrust from one end of a linear actuator movable in a given plane to angularly displace a movable element with respect to a fixed support to which the other end of the actuator is secured, comprising a pair of concentric inner and outer members, one secured to the movable element and the other to said one end of the actuator; one of said members having a circular cross-section and the other member a non-circular cross-section; and a body of rubber filling the space between said members and bonded thereto, said body of rubber being normally stressed in shear in substantially all operative positions of said actuator; said non-circular member having its shorter dimension in the plane of movement of the actuator.

4. A flexible thrust transmitting mounting means, for transmitting thrust from one end of a linear actuator movable in a given plane to angularly displace a movable element with respect to a fixed support to which the other end of the actuator is secured, comprising a pair of concentric inner and outer members, one secured to the movable element and the other to said one end of the actuator; the outer member having a circular cross-section and the inner member a non-circular cross-section; and a body of rubber filling the space between said members and bonded thereto, said body of rubber being normally stressed in shear in substantially all operative positions of said actuator; said inner member having its short dimension in the plane of movement of the actuator, whereby the greater mass of said rubber body is disposed in such plane.

5. A flexible thrust transmitting mounting means, for transmitting thrust from one end of a linear actuator movable in a given plane to angularly displace a movable element with respect to a fixed support to which the other end of the actuator is secured, comprising a pair of concentric inner and outer members, one secured to the movable element and the other to said one end of the actuator, the outer member having a circular cross-section and the inner member a substantially rectangular cross-section; and a body of rubber filling the space between said members and bonded thereto, said body of rubber being normally stressed in shear in substantially all operative positions of said actuator; said inner member having its short dimension in the plane of movement of the actuator, whereby the greater mass of said rubber body is disposed in such plane.

6. A flexible thrust transmitting mounting means, for transmitting thrust from one end of a linear actuator movable in a given plane to angularly displace a movable element with respect to a fixed support to which the other end of the actuator is secured, comprising an outer annular sleeve member and an inner member having a substantially elliptical cross-section, one of said members being secured to the movable element and the other to one end of the actuator; and a body of rubber filling the space between said members and bonded thereto, said body of rubber being normally stressed in shear in substantially all operative positions of said actuator; said inner substantially elliptical member having its shorter dimension in the plane of movement of the actuator, whereby the greater mass of said rubber body is disposed in such plane.

7. A flexible thrust transmitting mounting means, for transmitting thrust from one end of a linear actuator movable in a given plane to angularly displace a movable element with respect to a fixed support to which the other end of the actuator is secured, comprising a pair of concentric inner and outer members, one secured to the movable element and the other to said one end of the actuator; one of said members having a circular cross-section and the other member a non-circular cross-section; and a body of rubber filling the space between said members and bonded thereto, said body of rubber being normally stressed in shear in substantially all operative positions of said actuator and being formed with apertures extending axially therethrough in the plane of movement of the actuator; said non-circular member having its shorter dimension in the plane of movement of the actuator.

8. A flexible thrust transmitting mounting means, for transmitting thrust from one end of a linear actuator movable in a given plane to angularly displace a movable element with respect to a fixed support to which the other end of the actuator is secured, comprising an outer annular sleeve member and an inner member having a substantially elliptical cross-section, one of said members being secured to the movable element and the other to one end of the actuator; and a body of rubber filling the space between said members and bonded thereto, said body of rubber being normally stressed in shear in substantially all operative positions of said actuator and being formed with apertures extending axially therethrough in the plane of movement of the actuator, said apertures providing for stress displacement of said rubber when said members are angularly displaced; said inner substantially elliptical member having its shorter dimension in the plane of movement of the actuator, whereby the greater mass of said rubber body is disposed in such plane.

WILLIAM P. LEAR.